April 7, 1936.  L. F. NENNINGER ET AL  2,036,293
MACHINE FOR MILLING, PROFILING AND THE LIKE
Filed May 31, 1935  7 Sheets-Sheet 1

INVENTORS
LESTER F. NENNINGER
MILLARD ROMAINE
BERNARD SASSEN
BY
AHK Parsons
ATTORNEY.

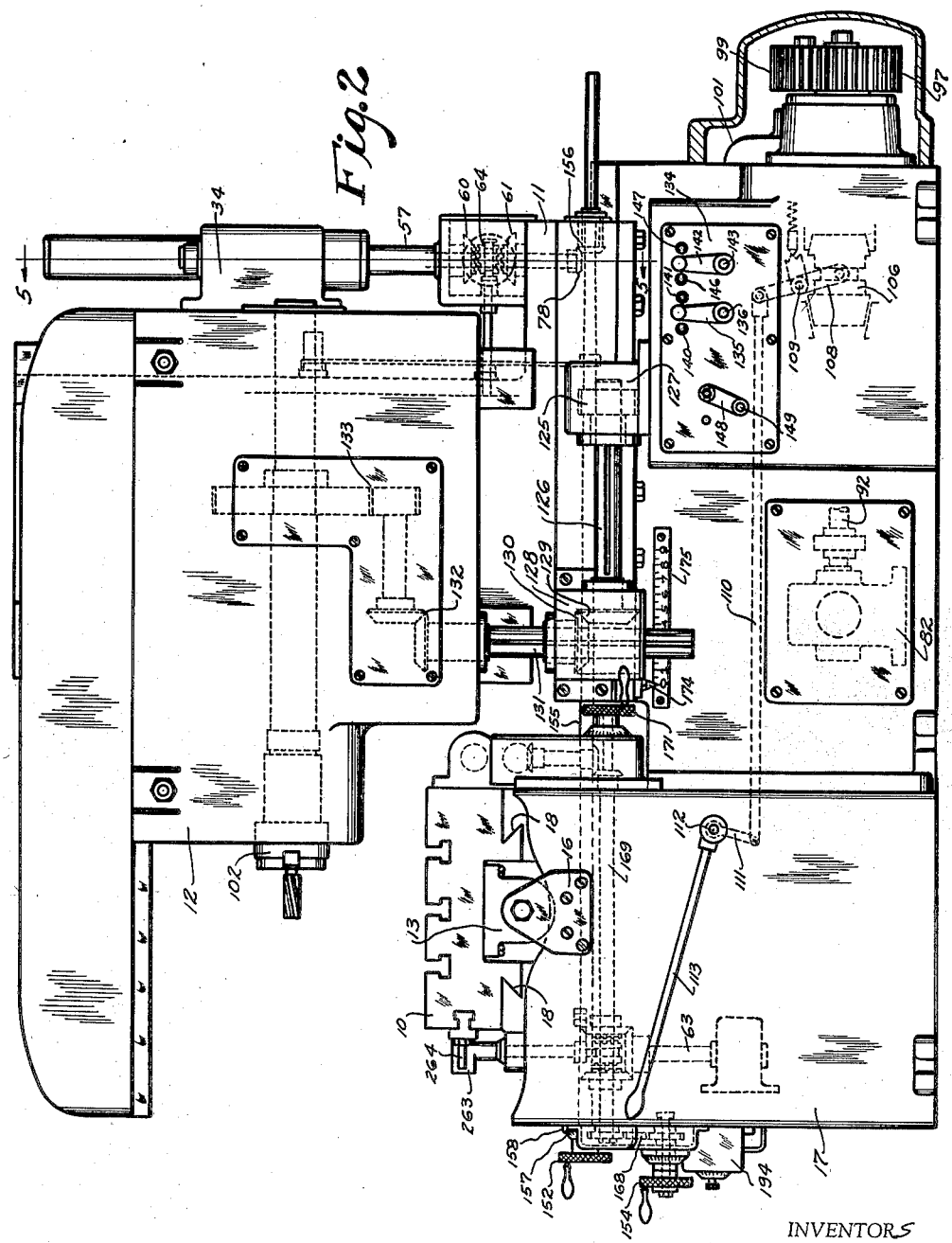

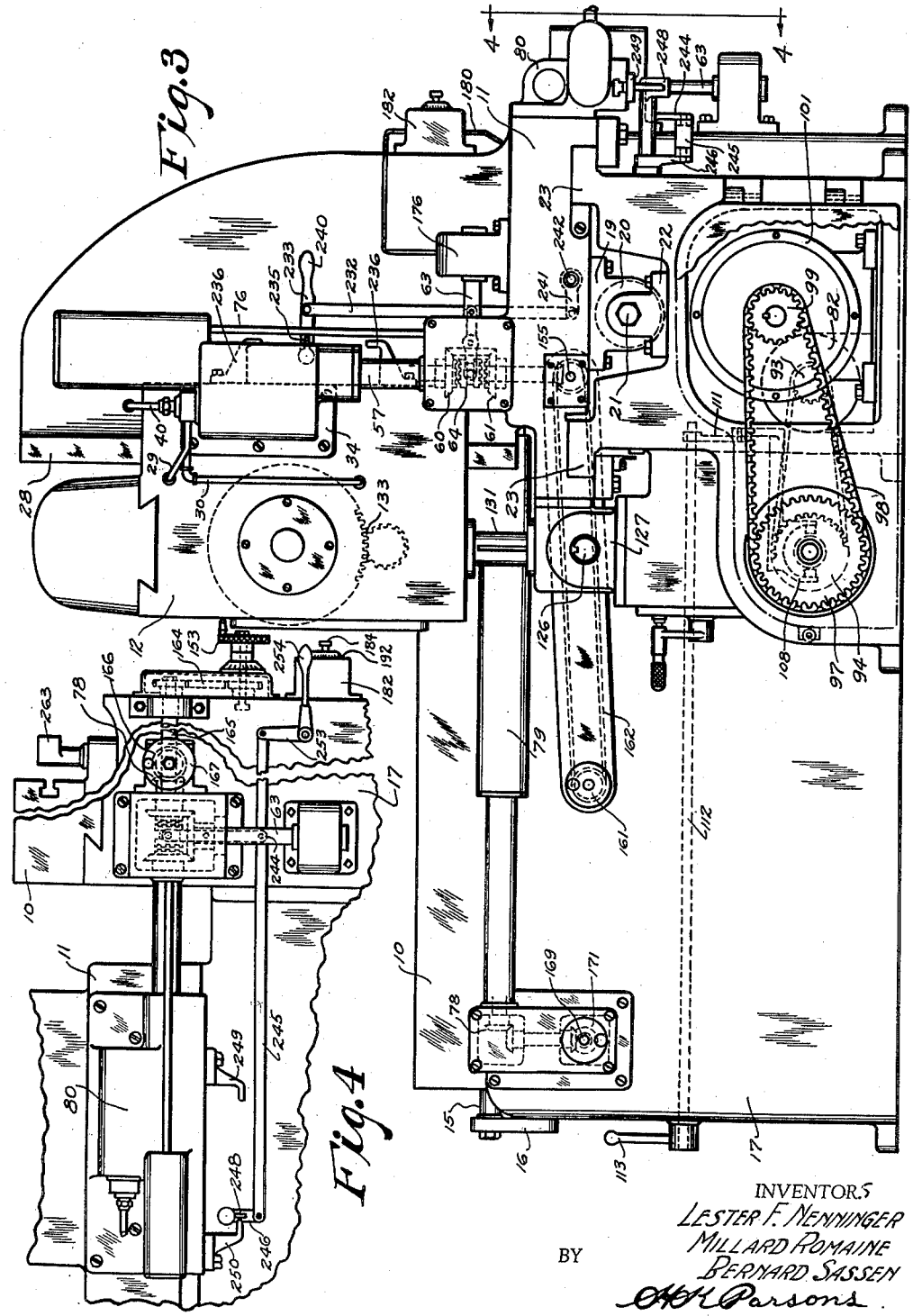

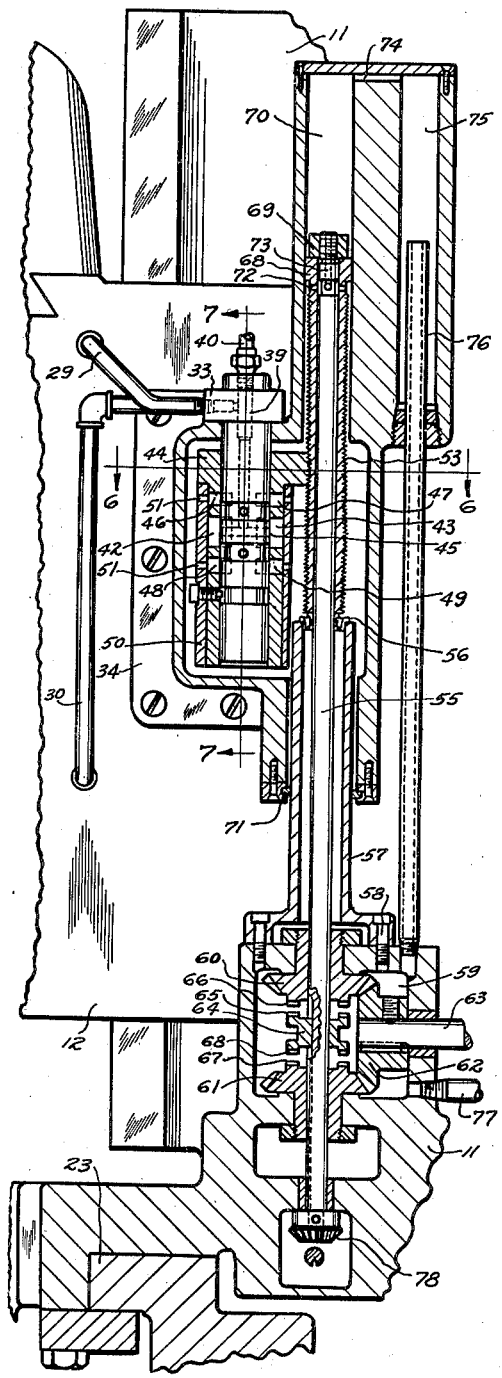

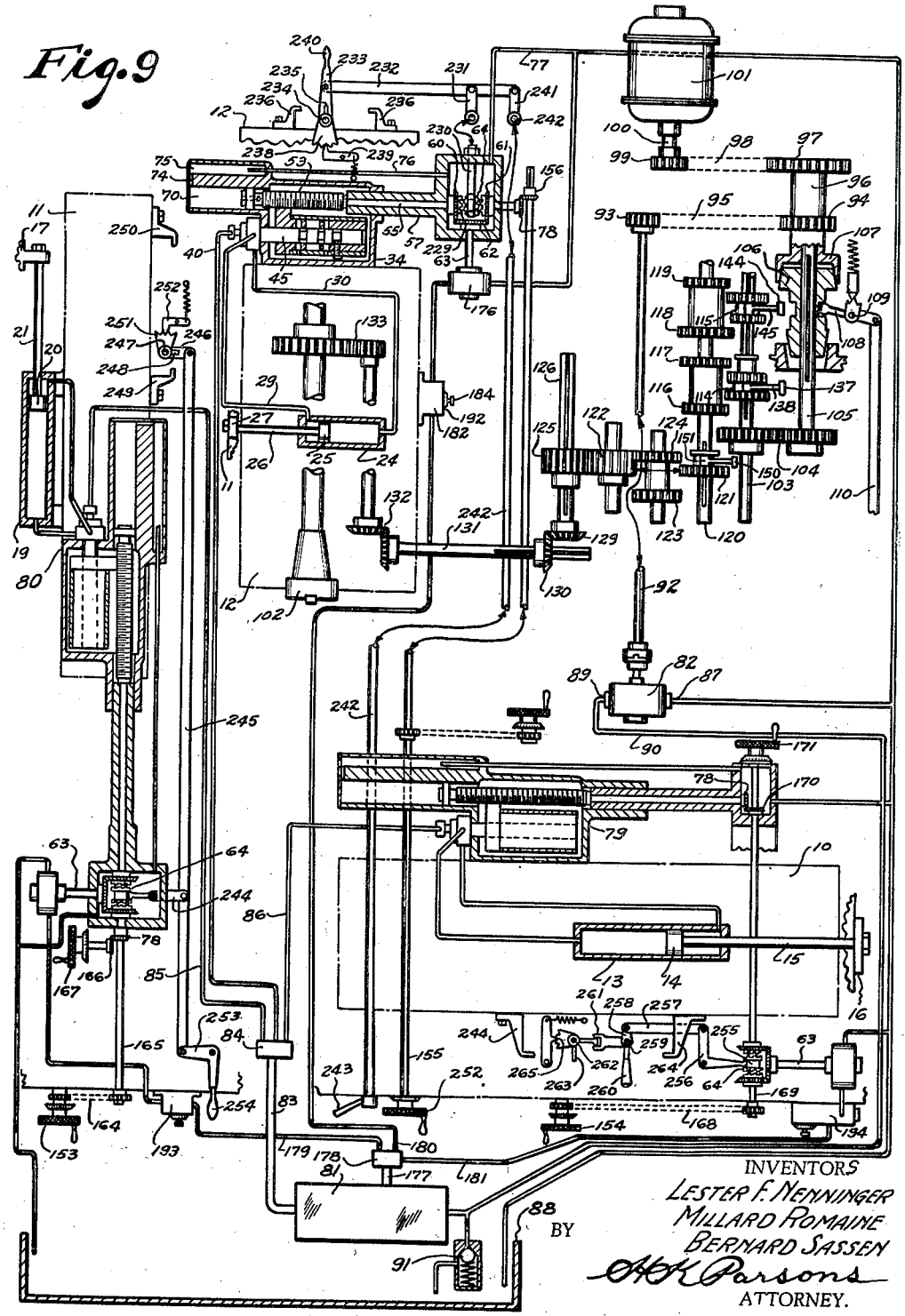

April 7, 1936.                L. F. NENNINGER ET AL            2,036,293
                    MACHINE FOR MILLING, PROFILING AND THE LIKE
                            Filed May 31, 1935        7 Sheets-Sheet 6

INVENTORS
LESTER F. NENNINGER
MILLARD ROMAINE
BERNARD SASSEN
BY
Parsons
ATTORNEY.

April 7, 1936.  L. F. NENNINGER ET AL  2,036,293
MACHINE FOR MILLING, PROFILING AND THE LIKE
Filed May 31, 1935  7 Sheets-Sheet 7

INVENTORS
LESTER F. NENNINGER
MILLARD ROMAINE
BERNARD SASSEN
BY
A. K. Parsons
ATTORNEY.

Patented Apr. 7, 1936

2,036,293

UNITED STATES PATENT OFFICE 2,036,293

MACHINE FOR MILLING, PROFILING, AND THE LIKE

Lester F. Nenninger, Millard Romaine, and Bernard Sassen, Cincinnati, Ohio, assignors to The Cincinnati Milling Machine Co., Cincinnati, Ohio, a corporation of Ohio Application May 31, 1935, Serial No. 24,224

22 Claims. (Cl. 90—15)

This invention relates to machine tools and more particularly to an improved machine suitable for milling, profiling or the like.

One of the objects of this invention is to provide a power transmission and control mechanism for a machine of the above character which is so contrived that part of the power may be utilized during manual operation to reduce the effort of the operator and thereby make possible the easy manual maneuvering of heavy slides for profiling operations.

Another object of this invention is to so contrive a power transmission and control mechanism for effecting power feeding movements between the tool and work of a milling machine that a fractional horse power prime mover may be utilized to effect, control, and regulate said movement.

A further object of this invention is to provide each movable slide of a machine of the character described with an individual power unit of the servo-type which may be utilized at all times for adjustment thereof, regardless of whether said adjustment is effected manually or by power.

An additional object of this invention is to facilitate manual adjustment of the various slides of a milling machine whereby each slide may be easily and quickly manually adjusted with the same minimum of effort, regardless of the weight of the slide or the direction in which it is moved, thereby making it possible to build large heavy profiling machines for manual operation.

A still further object of this invention is to provide a centralized manual control station from which the movement of all slides may be conveniently governed so as to render the machine suitable for profiling purposes.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 2 is a view of the machine shown in Figure 1 as viewed from the right of that figure.

Figure 3 is a rear view of the machine shown in Figure 1.

Figure 4 is a detail view of the saddle operating mechanism as viewed on the line 4—4 of Figure 3.

Figure 5 is a section on the line 5—5 of Figure 2.

Figure 6 is a section on the line 6—6 of Figure 5.

Figure 7 is a section on the line 7—7 of Figure 5.

Figure 8 is a section on the line 8—8 of Figure 1.

Figure 9 is a schematic diagram of the transmission and control mechanism of the machine.

Figure 1:
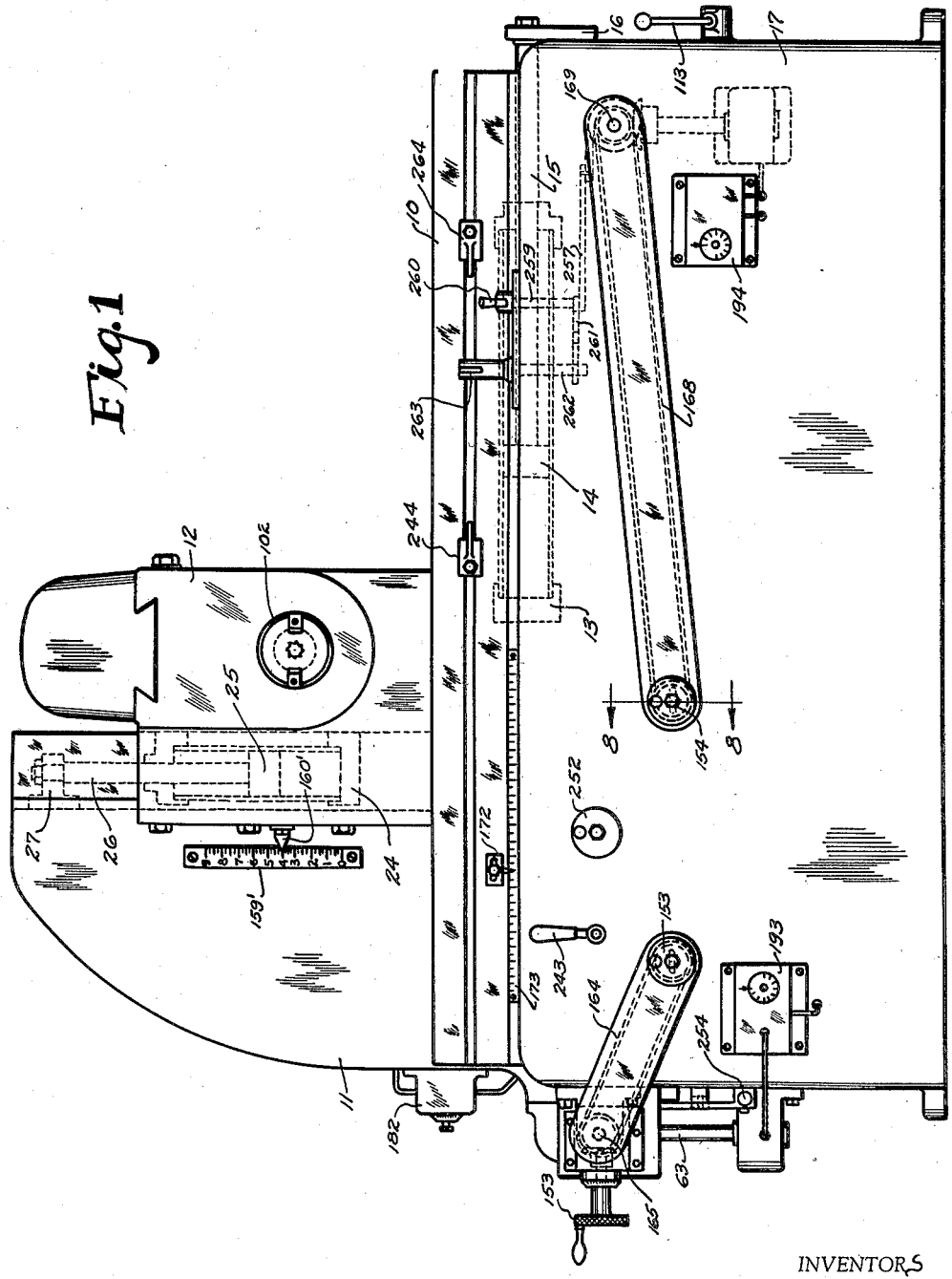
Figure 1 is an elevation of an exemplary embodiment of this invention.

There is shown in Figures 1, 2 and 3 of the drawings an exemplary embodiment of the machine and it will be noted that the machine has three relatively movable slides, 10, 11 and 12. Since it is conventional practice, however, to distinguish or identify the slides by the elements carried thereby, this will be done, although the terms so applied are not to be considered as limiting.

For instance, the slide 10 may be termed the work supporting slide or the work table; the slide 11 may be termed a saddle and the slide 12 may be termed the tool support or spindle carrier. The various elements may be redistributed as respects the several slides, but in any event the final purpose is to obtain three-directional relative movement between the tool and work.

In conventional machines of the mechanical type, it has been the practice to provide a final actuator for a slide, which, when moved, or operated, will cause slide movement; together with manual means and power means for operating said actuator. The force or power applied in such cases was always proportional to the total weight to be moved, the friction to be overcome, the momentum of the parts, etc.

In order to make manual operation at all feasible, the expedient of mechanical advantage was resorted to, but since there is a practical limit to the amount of mechanical advantage that can be applied, it has required a great amount of exertion on the part of the operator to move heavy slides, resulting in the fact that it was highly impractical for the operator to attempt to maneuver the tool through an irregular cutting path usually required in profiling operations.

In addition, the mechanism for producing power movement at variable rates required heavy and cumbersome gear boxes, which represent a large investment in parts, some of which are perhaps never used, or at the best, utilized very little.

In conventional hydraulically operated milling machines no provision has been made for manually effecting relative movement between the tool and work with the result that manual guided profiling operations are impossible on such machines.

The transmission and control mechanism of the present machine is designed to eliminate these various difficulties and to provide a machine in which the various slides may be freely and easily moved by hand, with practically no effort regardless of their resistance against movement whereby the tool may be easily manipulated along an irregular cutting path as required in profiling operations; or fed by power at controlled variable rates with a mechanism which is very light, compact and composed of a relatively small number of parts.

In other words, the present invention contemplates the use of a power unit of a servo type for the individual slides, together with suitable manual and power operable means for selectively controlling operation of said unit, with the result that the controlling force to be applied is the same in all cases regardless of whether it is applied by hand, or by power; and regardless of the final load or resistance to be overcome. This force is so small that two slides can be simultaneously controlled by the operator in a very easy and convenient manner, whereby exceptionaly large machines of the character disclosed may be built and utilized for hand controlled profiling operations, which otherwise would be impracticable and almost impossible.

The table 10 is provided with a cylinder 13 which is fastened to the underside of the slide as more particularly shown in Figure 2, the cylinder having a contained piston 14 which is operatively connected by a piston rod 15 to a bracket 16 which is fixed to the bed 17 of the machine. The table 10 is supported in guide ways 18 formed in the bed and this movement is effected by admitting pressure fluid to one end or the other of cylinder 13.

The saddle 11 is also provided with a cylinder 19 which is attached to the underside thereof, as more particularly shown in Figure 3. This cylinder has a piston 20 which is operatively connected by a piston rod 21 to a bracket 22 which is fixed to the bed of the machine. The saddle is supported on guide ways 23 and is moved therealong by admitting pressure fluid to one end or the other of cylinder 20.

Likewise the vertical slide or spindle carrier 12 has a cylinder 24 secured to one side thereof as more particularly shown in Figure 1 and this cylinder has a contained piston 25 operatively connected by a piston rod 26 to a fixed bracket 27. The slide 12 is vertically movable by admitting pressure to one end or the other of cylinder 24 along the vertical guide ways 28 formed on one vertical face of the saddle 11.

The servo unit which ultimately controls the admission of fluid pressure to the opposite ends of a slide cylinder is the same for each slide and therefore only one of these units will be explained, and that one will be the unit connected for control of the slide 12 and which is shown in detail in Figure 5.

The opposite ends of cylinder 24 are connected by pipes 29 and 30, which are connected to ports 31 and 32 of a valve member 33 which is fixed with the bracket 34 carried by the slide 12 and movable therewith, as shown in Figure 7. These ports intersect longitudinal bores 35 and 36 respectively which terminate in annular grooves 37 and 38 formed in the periphery of the valve member 33. Additionally, the member 33 has a central or axial bore 39 which is connected by a channel 40 to a source of fluid pressure. The bore 39 interconnects a diametrical bore 41, the opposite ends of which terminate in the periphery of the member 33 and opposite a pair of arcuate slots 42 and 43 cut in the periphery of the sleeve 44.

It will be noted that the annular grooves 37 and 38 form an intermediate spool 45, whereby when the parts are in the position shown in Figure 5 the pressure fluid from the supply pipe 40 will pass in suitable proportions to the annular grooves and thereby through the pipes 29 and 30 to opposite ends of the cylinder to create equal resultant opposing pressures on the piston, in spite of its differential areas, and thereby hold the slide against movement.

The sleeve 44 is provided with an additional pair of diametrically opposite arcuate grooves 46 and 47 spaced to one side of the arcuate grooves 42 and 43 and with a second pair of diametrically opposite arcuate grooves 48 and 49 spaced on the opposite side of the grooves 42 and 43. The grooves 46, 47, 48 and 49 are exhaust grooves and are so positioned that when the parts are in the position shown in Figure 5, neither one of the annular grooves 37 and 38 are connected thereto, but upon the slightest relative movement between the member 44 and the member 33, one of these grooves will be connected to exhaust, whereby movement of the slide 24 will be effected.

It will be noted that the member 44 has a reduced portion around which is fitted an outer sleeve 50 in which is formed radial holes 51 opposite the grooves 46, 47, 48 and 49 through which the exhaust fluid may escape.

The member 44 is freely slideable relative to the member 33 upon which it is guided, but it is held against axial movement by a threaded quadrant 52 which, as shown in Figure 6, is held in engagement with the screw 53 by the spring pressed ball 54. From the construction, as shown in Figure 6, it will be seen that the member 44 is held against rotation.

The screw 53 is keyed or otherwise secured to the shaft 55 which is anchored against longitudinal movement by a thrust bearing 56, which is interposed between the end of the screw 53 and the upper end of the tubular housing 57 which is attached or otherwise secured as by bolts 58 to the saddle 11.

The shaft 55 extends downward through the tubular housing 57 into the gear box 59 in which is rotatably supported a pair of bevel gears 60 and 61 co-axial of the shaft 55 and intermeshing with a common bevel gear 62. The bevel gear is adapted to be driven by power through a shaft 63 which thereby rotates the gears 60 and 61 in opposite directions and relative to the shaft 55. A clutch member 64 is splined on the shaft 55 intermediate the bevel gears 60 and 61 and has clutch teeth 65 on opposite faces thereof adapted to selectively interengage clutch teeth 66 or 67 formed on the opposing faces of gears 60 and 61 respectively. Thus, by shifting the clutch from the neutral position shown the shaft 55 may be rotated by power and thereby through the screw 53 and nut segment 52 the sleeve 44 may be moved relative to the valve member 33 to connect pressure to one end of cylinder 24 and connect the other end of the cylinder to exhaust to cause movement of the slide 24. The movement of the slide will, in turn, through the bracket 34 attached thereto, cause movement of the member 33 in the same direction as the sleeve 44 was moved and return the parts to the position as shown in Figure 5, thus stopping the slide movement.

Due to the length of the shaft 55 it was deemed advisable to support the upper end thereof, and to this end a piston member 68 is attached and held thereto by a nut 69 threaded on the end of the shaft. This piston member slides in a bore 70 formed in a part of the irregular shaped housing 34.

To facilitate lubrication of the parts the fluid exhausting through the openings 51 is held in the interior of the housing 34 by a suitable gasket or seal 71 which slides along the exterior of the tubular housing 57. When the space in this housing becomes filled, the oil can escape through the radial passages 72 and axial bore 73, which are adjacent the upper end of shaft 55, into the upper end of the cylinder 70, thereby lubricating the walls of the cylinder for easy movement of the piston therein, and any excess can overflow through the passage 74 into the chamber 75 and thereby through the return pipe 76 into the gear box 59. This will lubricate the gears in the box and the excess fluid can return through the pipe 77 to reservoir.

The shaft 55 is provided with a bevel gear 78 on the lower end thereof, which bevel gear may be connected through suitable means for manual operation of the shaft 55 when the clutch member 64 is in a central position. From the foregoing it will now be seen that a servo power unit has been provided for a slide which may be operated through manual means or by power means, and in either direction to effect opposite movements of the slide. This entire mechanism, as shown in Figure 5, is duplicated for each of the other movable slides of the machine and for purposes of identification the servo motor unit for the slide 10 is indicated generally by the reference numeral 79 in Figure 9 and the servo motor unit for the slide 11 is indicated generally by the reference numeral 80.

Referring to Figure 9, these units derive their pressure from an accumulator 81 which, in turn, is supplied by a pump 82. The accumulator 81 has a main delivery channel 83 which is connected to a header 84 and from this header there is a channel 40 extending to the servo motor unit for the vertical slide, a channel 85 which supplies pressure to the servo unit 80 for the saddle, and a channel 86 which supplies fluid pressure to the servo unit 79 of the table 10.

The pump 82 has an intake 87 through which it draws fluid from a reservoir 88 located in a suitable position in the bed of the machine and a delivery port 89 to which is connected a channel 90 that carriers the fluid under pressure to the accumulator 81. The channel 90 may have a relief valve 91 connected thereto for safety purposes. The use of the accumulator makes it possible to have large quantities of fluid under pressure available for immediate use.

The pump 82 has connected to it a shaft 92 upon which is secured a sprocket wheel 93 for actuation from a sprocket wheel 94 through a chain 95, the latter-named sprocket wheel being secured to the constantly driven shaft 96. The shaft 96 is connected by a sprocket wheel 97 and chain 98 to a sprocket wheel 99 secured to the end of armature shaft 100 of the prime mover 101. Thus, the pump is continuously driven during operation of the prime mover. The prime mover is also utilized for actuating a tool spindle 102 which is journaled in the carrier 12 of the machine. This transmission is a variable speed mechanism and comprises a first shaft 103 which is connected through gearing 104 to shaft 105 upon which is splined the clutch member 106 for connecting the shaft to the constantly driven clutch member 107. The clutch 106 is shifted by the shifter fork 108 which is centrally pivoted at 109 and connected by a link 110 to a crank 111, which, as shown in Figure 2, is secured to a shaft 112 having a manually operable lever 113. This lever, it will be noted, is adjacent the front of the machine for easy access by the operator.

The shaft 103 has a first pair of shiftable gears 114 and a second pair of shiftable gears 115 splined thereon for selective interconnection with gears 116, 117, 118 and 119 carried by shaft 120, whereby this shaft may be rotated at four different speeds. The shaft 120 also has a shiftable gear 121 which may be directly connected to gear 122 for effecting one direction of rotation of the spindle, or indirectly by engagement with gear 123 and the co-axial idler 124 for rotation of the spindle in an opposite direction. The gear 122 intermeshes with a gear 125 which is splined on a shaft 126, the gear 125 being held against longitudinal movement in the bracket 127 mounted on the bed of the machine, and the shaft 126 being fixed in the bracket 128, fixed for movement with the saddle 11. The bracket 128 has a pair of bevel gears 129 and 130 journaled therein, one of them being fixed with the shaft 126 and the other being splined on the vertical shaft 131 which is fixed against axial movement relative to the slide 12, whereby upon upward or downward movement of the slide the shaft will slide through the bevel gear 130. The shaft 131 is connected through bevel gearing 132 and spur gear 133 to the tool spindle 102. Thus, by means of the sliding joint in the bracket 128 and the sliding joint in the bracket 127 the spindle may be moved in two directions while still being rotated by the prime mover 101 located in the bed of the machine.

The shiftable gears 114 and 115 constitute a speed change mechanism for the tool spindle and these are shifted by levers mounted on the outside of the gear box 134, as more particularly shown in Figure 2. The lever 135 is integrally connected to a shaft 136 to which is connected an arm 137 having a shifter fork 138 pivotally connected thereto and engaging the gear couplet 114. The lever 135 is shiftable against the stop 140 to engage one gear of the couplet with gear 116 and against the stop 141 to engage the other gear of the couplet 114 with gear 117 and to a third or central position, such as that shown in Figure 2, to disengage the couplet from both gears 116 and 117.

The lever 142 is integrally connected to a shaft 143 which has an arm 144 fixed therewith inside of the gear box which pivotally supports a shifter fork 145 for shifting the couplet 115. When the lever 142 is moved against the stop 146, one gear of couplet 115 engages the gear 118 and when the lever is shifted against the stop 147 the other gear of the couplet is intermeshed with gear 119. The lever 142 also has a third position which, as shown in Figure 2, disengages the couplet from both gears 118 and 119. This mechanism constitutes a speed change mechanism for varying the speed of rotation of the tool spindle.

There has been nested in a convenient position at the front of the machine a group of control levers for determining manual operation of the various slides whereby the operator may simultaneously control the movement of any two slides without changing his position. This group of controls is shown in Figure 1 and comprises the rotatable hand wheel 152 which may be utilized to control vertical movement of the carrier 12; a hand wheel 153 which is operatively connected for controlling movement of the saddle 11 and a hand wheel 154 which is operatively connected for controlling movement of the table 10.

Figure 14:
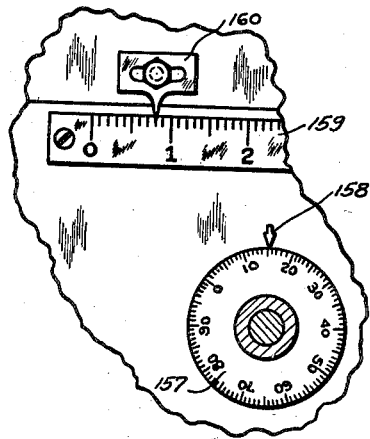
Figures 14 and 15 are views representing different dial systems utilized for indicating the length of slide movement.

As shown in Figures 2 and 9, the wheel 152 is fixed to the end of a shaft 155 which is fixed against axial movement in the bed 17 and extends through the saddle into the splined connection with a bevel gear 156 which is fixed for movement with the saddle. This shaft has a dial 157 integral therewith adjacent the hand wheel 152 which cooperates with the fixed pointer 158 for indicating the amount of adjustment effected. This dial may be graduated in thousandths of an inch and the number of such graduations may depend upon the amount of movement to be effected for one rotation of the hand wheel. As shown in Figure 14, if one rotation of the hand wheel effects one-tenth of an inch slide movement, the dial may be subdivided into one hundred graduations and a linear scale 159 graduated in tenths of an inch and cooperating with the rotatable dial to indicate the total movement effected.

Figure 15:
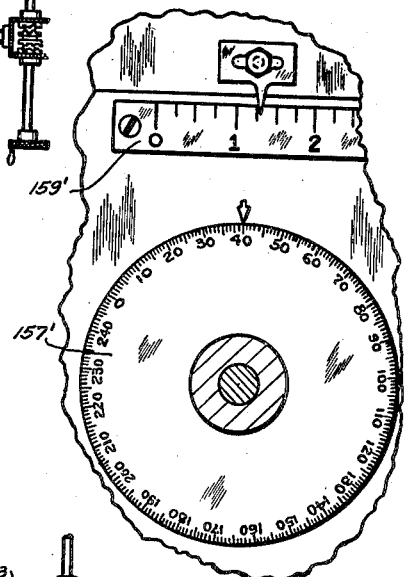

On the other hand, as shown in Figure 15, if one rotation of the hand wheel effects a ¼″ movement, the dial 157' may be divided into 250 graduations and the linear scale 159, utilized therewith, divided into quarters of an inch. The linear scale, such as 159', may be attached to the column 11 and the pointer 160' attached to the carrier, whereby relative movement may take place between the parts. Since the scale 159' is positioned for observation from the front of the machine the operator may very easily compute from that scale and from the dial 157 the length of any desired movement he wishes to make.

Since it may be desirable at this time to control the machine from the rear side of the table 10, as viewed in Figure 1, an additional hand wheel 161 may be provided and operatively connected, as shown in Figure 3, by a sprocket and chain connection indicated generally by the reference numeral 162 to the shaft 155. This hand wheel may also have a dial 163 integral therewith.

The hand wheel 153 is operatively connected by a sprocket and chain, indicated generally by the reference numeral 164, to shaft 165 which corresponds to an extension of shaft 55 shown in Figure 5. This will control operation of the servo unit 80 and thereby in and out movement of the saddle 11.

The bevel gear 78 of the unit 80 may be connected to a bevel gear 166 and to a second hand wheel 167, which as shown in Figure 4, permits adjustment of the saddle from a position adjacent the end of the table 10.

The hand wheel 154 is operatively connected by a chain and sprocket connection indicated generally by the numeral 168 to shaft 169, which shaft is connected by a bevel gear 170 to the bevel gear 78 of the servo motor unit 79. This shaft extends beyond the rear of the bed 17, as shown in Figure 3, where it is provided with a second hand wheel 171 whereby movement of the table 10 may be controlled from either side of the bed 17.

As shown in Figure 1, the table 10 may be provided with a pointer 172 cooperating with a linear scale 173 which is fixed with the bed for indicating the amount of slide movement. Similarly, as shown in Figure 2, the saddle may be provided with a pointer 174 movable therewith with respect to a fixed scale 175.

As previously mentioned in connection with Figure 5, each servo unit has a power shaft 63 whereby movement of the slide may be power effected, and by means of the mechanism now to be described, this movement may be effected at variable feed rates and an adjustable dog trip mechanism is also provided for terminating the power movement at desirable points.

Since the actual power necessary to rotate the shaft 63 of any one of the servo units is only a fraction of one horse power, the power operable means for rotating it may be very light, compact and inexpensive to manufacture. In Figure 9, there is shown one form of variable feed mechanism, and since this mechanism is the same for each of the three slides only one will be described in detail. Taking the vertical carrier 12 as an example, the shaft 63 has connected to it a fluid operable motor 176. This motor is supplied with fluid pressure from the accumulator 81, which has a second supply pipe 177 connected to a header 178 from which extends three branch lines 179, 180 and 181 for supplying fluid to the motors of the three slides. As shown in Figure 9, the line 180 is connected to a feed rate control mechanism, indicated generally by the reference numeral 182. This mechanism actually comprises a throttle device which is shown in detail in Figure 11. The shaft 183 to which is connected the handle 184 has a cam 185 keyed therewith for controlling the position of a spring pressed throttle 186. The line 180 is connected to a port 187 in the valve sleeve 188 and the plunger 186 has a tapered spool 189 which determines the drop in pressure to port 190 and thereby to the motor 176.

The spring 191 tends to shift the plunger 186 in a direction tending to open port 190 and the cam has a configuration, which upon rotation thereof in a counterclockwise direction, will gradually close the port 190. A suitable graduated dial 192 may be keyed with the shaft 183 for indicating the various feed rates effected.

A similar throttle mechanism, indicated generally by the reference numerals 193 and 194, may be provided on the front of the machine and suitably connected for controlling the rate of power movement of the saddle and the table respectively.

Figure 12:
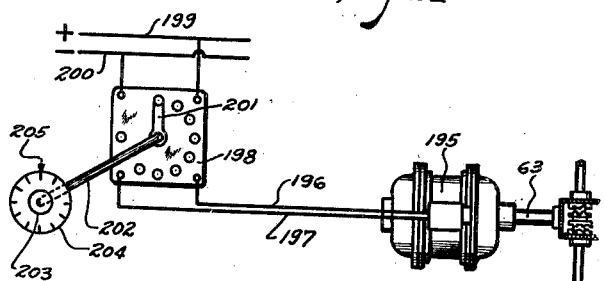
Figure 12 is a diagrammatic view of an electrical rate control device.
Figure 13:
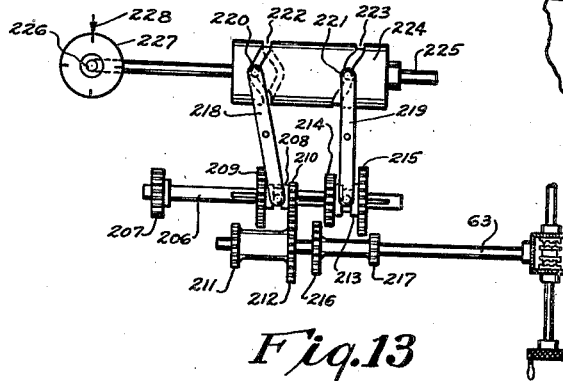
Figure 13 is a diagrammatic view of a mechanical rate control device.

The invention is not limited to the use of variable feed mechanisms of the fluid operable type, and therefore, alternative forms which might be used have been illustrated in Figures 12 and 13.

In Figure 12 an electrically operable feed mechanism has been illustrated comprising an electric motor 195 which may be directly connected to shaft 63 or, through conventional reduction gearing, and the leads 196 and 197 of the motor, may be connected to a rheostat 198 for controlling the rate of rotation thereof. This rheostat may be supplied with power from a pair of power mains 199 and 200 in a conventional manner. The rheostat control lever 201 may have a shaft extension 202 to a manually rotatable hand wheel 203 and cooperating dial 204 and pointer 205.

In Figure 13 is shown a shiftable gear type of variable feed mechanism comprising a power shaft 206 having a driving gear 207 which may be operatively connected to a suitable prime mover, such as the main prime mover of the machine, or an individual prime mover.

The power shaft 206 may be provided with a first shiftable gear couplet 208 comprising gears 209 and 210, shiftable respectively into mesh with gears 211 and 212; and a second gear couplet 213 comprising gears 214 and 215 shiftable respectively into mesh with gears 216 and 217.

The gears 211, 212, 216 and 217 may be integral with shaft 63. The couplets may be provided with pivoted shifter forks 218 and 219 which have rollers 220 and 221 on one extremity thereof, interengaging in cam grooves 222 and 223 respectively of a rotatable cam 224. The cam grooves 222 and 223 may be so formed that only one of the four shiftable gears is in driving mesh at a time, and furthermore so arranged that during one continuous rotation of the cam supporting shaft 225 the feed rate will be progressively increased. The shaft 225 may also be provided with an operating hand wheel 226 and a cooperating dial 227 and pointer 228.

Thus, it will be seen, that regardless of the particular type of variable feed power mechanism utilized for rotation of the shaft 63, that each has associated therewith a manually operable rate selector and cooperating dial for indicating the rate selected. With such a system it is obvious that the various slides may be power moved simultaneously at individually different rates.

The clutch member 64, which connects the prime mover 176 for operation of the servo motor screw 53 of the vertical slide 12, is shifted by a fork 229 pivotally connected to the oscillatable shaft 230. This shaft has a lever arm 231 which is connected by a link 232 to a lever arm 233, keyed with the trip plunger 234. This trip plunger has a lug 235 which is adapted to be alternately engaged by dogs 236 secured in a T slot 237 formed in the slide 12, as more particularly shown in Figure 6. A detent plate 238 is integral with the trip plunger and a spring pressed detent 239 is provided for holding the trip plunger in any one of three different positions. The lever arm 233 has a hand grip 240 formed on the end thereof whereby the clutch may be moved into either one of its operating positions and the trip dogs set for throwing the lever back to a central or stop position.

It may be desirable to control the clutch manually from the front of the machine and to that end the link 232 has an extension by which it is connected to the lever arm 241 keyed to shaft 242. This shaft extends through the bed 17 and is provided with an operating handle 243. Thus, after the dogs have been prepositioned the slide may be started from the front of the machine and automatically stopped by the dogs located on the slide.

The clutch 64 which controls the movement of the saddle also has a shifter fork which is operated by a crank arm 244 operatively connected by a link 245 to a crank arm 246 integral with a trip plunger 247. This plunger has a lug 248 for alternate engagement by dogs 249 and 250 for stopping the slide movement in either direction. A detent plate 251 and spring pressed detent 252 serve to hold the parts in any one of their positions.

The link 245 has an extension toward the front of the machine where it is connected to a bell crank 253 having a manually operable handle 254.

The reverser clutch 64 for the table also has a shifter fork 255 operatively connected to the bell crank 256 which has one arm connected by a link 257 and crank 258 to shaft 259. This shaft has a manually operable lever 260 by which the clutch may be manually shifted to either operating position.

The shaft 259 is connected by intermediate linkage 261 to the trip plunger 262 which has a trip arm 263 alternately engageable by trip dogs 264 carried by the table. A detent mechanism, indicated generally by the reference numeral 265, serves to hold the clutch in any one of three positions.

Mechanism has thus been provided for manually initiating power movement of the various slides to preselected feed rates, together with trip operable mechanism for terminating movement thereof.

Figure 10:
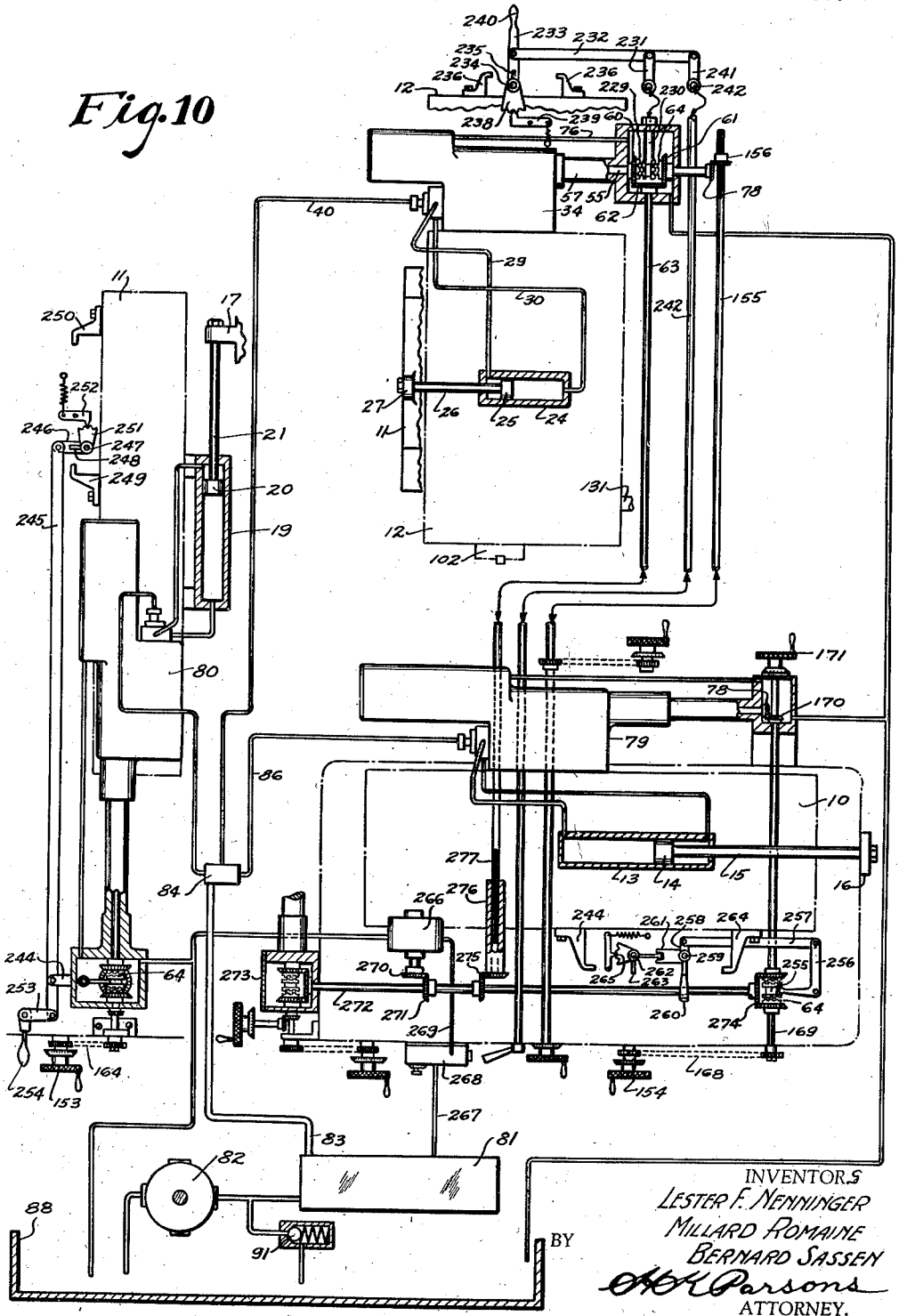
Figure 10 is a modified form of transmission and control circuit for the machine.

In the transmission and control mechanism illustrated diagrammatically in Figure 9, it was possible to preselect different feed rates for the various slides, and thus obtain simultaneous movement of two slides, for instance, at different rates, due to the fact that individual feed rate selectors have been provided for the various slides. In Figure 10 an alternative form is shown in which a common variable rate driver is provided, which is permanently connected to the three reverser gear boxes whereby if two slides are moved simultaneously they will both move at the same rate although this rate may be variable.

Figure 11:
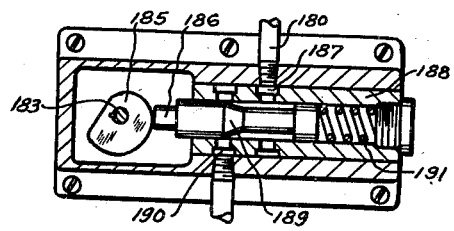
Figure 11 is a detail view of a hydraulic rate control device.

In this system the variable rate driver is a fluid operable motor 266 which is supplied with fluid from the accumulator 81 through a channel 267 which leads to a throttle valve 268 which may be similar to that shown in Figure 11, the throttle valve having a supply line 269 through which the fluid flows to the motor. Either of the other devices shown in Figures 12 and 13 might be substituted for this variable feed rate mechanism.

The motor 266 has a bevel gear 270 which intermeshes with bevel gear 271 fixed with the common drive shaft 272. As shown, the opposite ends of this shaft may be directly connected to the bevel gears in the reverser box 273 for the saddle, or the reverser mechanism 274 for the table. This shaft may also have a bevel gear connection 275 to a sleeve 276 which may be fixed against axial movement in the bed 17. This sleeve may have a spline connection with the spline shaft 277 which is operatively connected to the bevel gear 62 in the reverser box for the slide 12. The shaft 277 is fixed for movement with the saddle and the spline connection between it and the sleeve 276 permits this movement while maintaining a driving connection to the bevel gear 62.

There has thus been provided an improved transmission and control mechanism for milling machines which permits of easy and quick manual adjustment of any of the slides thereof, regardless of their actual resistance against movement, and in which the various slides may be moved by a power operable mechanism which is variable as to rate but which is simple, compact and inexpensive to manufacture.

We claim:

1. In a machine tool having a work carrier and a tool carrier, the combination of means for effecting relative movement between the carriers comprising an hydraulic servo-motor mechanism having a control valve consisting of two relatively movable members, one of which is attached to the movable carrier, manual means for moving the other member of said valve to cause actuation of the servo-motor and thereby relative movement between the carriers, a power operable member, and means for selectively coupling said member for also causing movement of said other member.

2. In a machine tool having a work carrier and a tool carrier, the combination of means for effecting relative movement between the carriers comprising a servo-motor mechanism having a fluid operable part permanently connected to one of said carriers, a servo-valve having relatively movable valve members for determining the direction of application of pressure to said member and thereby the direction of said relative movement, manually operable means for relatively shifting said valve members whereby relative movement between the carriers may be controlled at will, and power operable uniformly actuated means selectively connectible for effecting a uniform continuous movement of one of said valve members and thereby a uniform rate of relative movement between the carriers.

3. In a machine tool having a work carrier and a tool carrier, the combination of fluid operable means for effecting relative movement between the carriers including a servo-valve, a screw operatively connected for actuation of said valve, and power operable means for causing uniform rotation of the screw and thereby a uniform relative feeding movement between the carriers.

4. In a machine tool having a work carrier and a tool carrier, the combination of fluid operable means for effecting relative movement between the carriers including a servo-valve, a screw operatively connected for actuation of said valve, power operable means for causing uniform rotation of the screw and thereby a uniform relative feeding movement between the carriers, trip dogs carried by the movable carrier, and means actuable thereby for interrupting movement of the servo-valve by said power means.

5. In a machine tool having a cutter support and a work support, the combination of a servo-motor, said motor consisting of relatively movable parts, one of which is attached to one of said supports, a servo-valve comprising two relatively movable valve parts, one of which is connected to the movable support, a screw anchored against axial movement, a nut segment carried by the remaining valve part and engaging said screw, and means to actuate said screw to effect relative movement between the supports.

6. In a milling machine having a bed, a work table reciprocably mounted upon the bed, and a tool spindle supported in adjacent relation to the table, the combination of means for effecting translation of the table relative to the spindle comprising a fluid operable servo-motor having a differential piston operatively connected to the table, a servo-control valve having a pressure port and a pair of delivery ports for delivering fluid to opposite ends of said piston, a valve spool eccentrically positionable with respect to said pressure port to prevent movement of said table, and means for shifting said spool in opposite directions with respect to said eccentric position to effect opposite movements of the table.

7. In a machine tool having a work carrier, a tool carrier, and a tool spindle journaled in the last named carrier, of means for moving said work carrier transversely to the axis of said spindle including an hydraulic servo-motor having a servo-control valve, a rotatable screw for shifting said servo-valve, manually operable means permanently operatively connected to the screw for effecting actuation thereof, a source of power, and a control clutch for selectively connecting said power means for actuation of the screw to effect uniform feeding movement of the work carrier.

8. In a machine tool having a bed, a work table reciprocably mounted upon said bed, and a tool carrier supported for movement in a plane normal to the axis of table movement, the combination of a fluid operable motor for shifting one of said parts, a servo-control valve for said motor having relatively movable control elements, one of which is fixed for movement with said movable part, and the other element held for independent movement with respect to said moving part, said last named element having a predetermined position with respect to its cooperating element whereby the resultant pressures of said motor will be equalized, manually operable means on the side of the bed opposite to the side at which the tool carrier is supported, and operatively connected for shifting said other element, a power operable member, and a reverser clutch for selectively connecting said power member for opposite actuation of said other element and thereby a relative movement at a uniform rate and in accordance with the rate of actuation of said power operable member.

9. In a machine tool having a bed, a work table reciprocably mounted upon said bed, and a tool carrier supported for movement in a plane normal to the axis of table movement, the combination of a fluid operable motor for shifting one of said parts, a servo-control valve for said motor having relatively movable control elements, one of which is fixed for movement with said movable part, and the other element held for independent movement with respect to said moving part, said last named element having a predetermined position with respect to its cooperating element whereby the resultant pressures of said motor will be equalized, manually operable means on the side of the bed opposite to the side at which the tool carrier is supported, and operatively connected for shifting said other element, a power operable member, a reverser clutch for selectively connecting said power member for opposite actuation of said other element and thereby a relative movement at a uniform rate and in accordance with the rate of actuation of said power operable member, said reverser clutch also having a position intermediate its two power transmitting positions for disconnecting said power member and thereby conditioning said manually operable means for control of said relative movement.

10. In a machine tool having a bed, a work table reciprocably mounted upon said bed, and a tool carrier supported for movement in a plane normal to the axis of table movement, the combination of a fluid operable motor for shifting one of said parts, a servo-control valve for said motor having relatively movable control elements, one of which is fixed for movement with said movable part, and the other element held for independent movement with respect to said moving part, said last named element having a predetermined position with respect to its co-operating element whereby the resultant pressures of said motor will be equalized, manually operable means on the side of the bed opposite to the side at which the tool carrier is supported, and operatively connected for shifting said other element, a power operable member, a reverser clutch for selectively connecting said power member for opposite actuation of said other element and thereby a relative movement at a uniform rate and in accordance with the rate of actuation of said power operable member, a scale graduated in fractions of an inch and a pointer, one of which is attached to the table and the other to the bed, and a micrometer dial associated with said manually operable means and graduated to sub-divide said fractions of an inch micrometrically whereby any predetermined length of slide movement may be accurately determined.

11. In a milling machine having a tool carrier and a work carrier, the combination of means for effecting relative movement between the carriers including a fluid operable motor having a movable part permanently connected to one of said carriers, a source of pressure therefor, a servo-control valve for determining the flow of pressure to said motor, an actuator for said valve, a power shaft, variable speed power means for rotating said shaft at different uniform rates, and means for reversely connecting said power shaft to said actuator.

12. In a milling machine having a tool carrier and a work carrier, the combination of means for effecting relative movement between the carriers including a fluid operable motor having a movable part permanently connected to one of said carriers, a source of pressure therefor, a servo-control valve for determining the flow of pressure to said motor, an actuator for said valve, a power shaft, variable speed power means for rotating said shaft at different uniform rates, means for reversely connecting said power shaft to said actuator, said variable speed power means including a power operable motor, and means for varying the rate of actuation of said motor.

13. In a milling machine having a tool carrier and a work carrier, the combination of means for effecting relative movement between the carriers including a fluid operable motor having a movable part permanently connected to one of said carriers, a source of pressure therefor, a servo-control valve for determining the flow of pressure to said motor, an actuator for said valve, a power shaft, variable speed power means for rotating said shaft at different uniform rates, means for reversely connecting said power shaft to said actuator, including a power operable motor, and means for varying the rate of rotation of said shaft by said motor.

14. In a milling machine having a tool carrier and a work carrier, the combination of means for effecting relative movement between the carriers including a fluid operable motor having a movable part permanently connected to one of said carriers, a source of pressure therefor, a servo-control valve for determining the flow of pressure to said motor, an actuator for said valve, a power shaft, variable speed power means for rotating said shaft at different uniform rates, means for reversely connecting said power shaft to said actuator, said means including an electric motor, and means for varying the rate of rotation of said power shaft by said motor.

15. A milling machine having a tool carrier, a tool spindle rotatably journaled in said carrier, a work carrier, said carriers being supported for movement in right angular directions, means to support one of said carriers for movement in a third direction normal to the plane of the other movements, a transmission and control mechanism for effecting the various carrier movements including a prime mover, a variable speed transmission selectively connectible with the prime mover for rotation of the spindle, a pump connected for continuous operation by the prime mover, separate fluid operable means for translating each carrier, branch connections from the pump to each of said fluid operable means, each branch connection including a servo-control valve, and separate means for controlling each of said servo-valves.

16. A milling machine having a tool carrier, a tool spindle rotatably journaled in said carrier, a work carrier, said carriers being supported for movement in right angular directions, means to support one of said carriers for movement in a third direction normal to the plane of the other movements, a transmission and control mechanism for effecting the various carrier movements including a prime mover, a variable speed transmission selectively connectible with the prime mover for rotation of the spindle, a pump connected for continuous operation by the prime mover, separate fluid operable means for effecting relative movement between the carriers in three directions, each of said means including a piston and cylinder, means connecting each of said cylinders to the pump including a servo-control valve, and clustered manually operable means for individually actuating the various servo-control valves.

17. In a milling machine having a tool carrier and a work carrier, the combination of means for effecting relative movement therebetween including a piston and cylinder one of which is connected to the carrier to be moved, a source of pressure, a servo-control valve consisting of relatively movable valve parts, one of which is connected to the moving carrier, said valve parts controlling the flow of fluid pressure to opposite ends of said cylinder, a screw for actuation of the other valve part and a fractional horse power motor adapted to be operatively connected for rotation of said screw.

18. In a milling machine having a tool carrier and a work carrier, the combination of means for effecting relative movement therebetween including a piston and cylinder one of which is connected to the carrier to be moved, a source of pressure, a servo-control valve consisting of relatively movable valve parts, one of which is connected to the moving carrier, said valve parts controlling the flow of fluid pressure to opposite ends of said cylinder, a screw for actuation of the other valve part, a fractional horse power motor adapted to be operatively connected for rotation of said screw, and means to vary the rate of rotation of said screw by said motor.

19. A profiling machine comprising a bed, a work table reciprocably mounted upon the bed, a piston and cylinder, one of which is supported by the bed and the other operatively connected to the table for effecting actuation thereof, a first slide supported by the bed for movement toward and from the table, a second slide supported by said first slide for movement in a direction normal to the direction of movement of the first slide, a pair of fluid operable motors respectively connected for moving said slides, a pump for supplying fluid under pressure to said motors and to said cylinder, a cutter spindle journaled in one of said slides, a prime mover mounted in the bed of the machine, a variable speed transmission operatively connected for actuation of the spindle, a control clutch for selectively connecting said transmission to the prime mover, means for connecting the pump to the prime mover for continuous actuation thereby, individual servo-control valves interposed between the pump and each of said motors and cylinder, said servo-control valves being located adjacent the slides which they control, and remote manually operable means for each of said servo-control valves clustered at an operating station at the front of a machine whereby the operator may quickly and effortlessly control the relative movement between the tool spindle and the work table in three directions.

20. A profiling machine comprising a bed, a work table reciprocably mounted upon the bed, a piston and cylinder, one of which is supported by the bed and the other operatively connected to the table for effecting actuation thereof, a first slide supported by the bed for movement toward and from the table, a second slide supported by said first slide for movement in a direction normal to the direction of movement of the first slide, a pair of fluid operable motors respectively connected for moving said slides, a pump for supplying fluid under pressure to said motors and to said cylinder, a cutter spindle journaled in one of said slides, a prime mover mounted in the bed of the machine, a variable speed transmission operatively connected for actuation of the spindle, a control clutch for selectively connecting said transmission to the prime mover, means for connecting the pump to the prime mover for continuous actuation thereby, individual servo-control valves interposed between the pump and each of said motors and cylinder, said servo-control valves being located adjacent the slides which they control, remote manually operable means for each of said servo-control valves clustered at an operating station at the front of a machine whereby the operator may quickly and effortlessly control the relative movement between the tool spindle and the work table in three directions, individual fractional horse power motors for actuation of the respective screws, and means clustered with said manual control means for controlling the connection of the motors to the respective screws.

21. A profiling machine comprising a bed, a work table reciprocably mounted upon the bed, a piston and cylinder, one of which is supported by the bed and the other operatively connected to the table for effecting actuation thereof, a first slide supported by the bed for movement toward and from the table, a second slide supported by said first slide for movement in a direction normal to the direction of movement of the first slide, a pair of fluid operable motors respectively connected for moving said slides, a pump for supplying fluid under pressure to said motors and to said cylinder, a cutter spindle journaled in one of said slides, a prime mover mounted in the bed of the machine, a variable speed transmission operatively connected for actuation of the spindle, a control clutch for selectively connecting said transmission to the prime mover, means for connecting the pump to the prime mover for continuous actuation thereby, individual servo-control valves interposed between the pump and each of said motors and cylinder, said servo-control valves being located adjacent the slides which they control, remote manually operable means for each of said servo-control valves clustered at an operating station at the front of a machine whereby the operator may quickly and effortlessly control the relative movement between the tool spindle and the work table in three directions, individual fractional horse power motors for actuation of the respective screws, means clustered with said manual control means for controlling the connection of the motors to the respective screws, and trip operable means associated with each slide for terminating power movement thereof.

22. In a milling machine having a plurality of movable slides for effecting relative movement between a tool spindle and a work piece in three directions normal to one another, the combination of a plurality of hydraulic servo-motor mechanisms, there being one associated with each slide, each of said mechanisms including a rotatable screw for actuating the servo-control valve, separate manually operable means for rotating each screw, a power shaft, a power operable motor for rotating said shaft, and means for selectively connecting said shaft with each of said screws for power actuation thereby.

LESTER F. NENNINGER.
MILLARD ROMAINE.
BERNARD SASSEN.